United States Patent [19]
Fuller

[11] Patent Number: 5,352,365
[45] Date of Patent: Oct. 4, 1994

[54] PROCESS FOR REMOVING SCALE, AND REDUCING SCALE FORMATION IN SEWAGE TREATMENT PLANTS

[76] Inventor: Richard L. Fuller, 1240 N. Jefferson Ste. P, Anaheim, Calif. 92807

[21] Appl. No.: 20,426

[22] Filed: Feb. 22, 1993

[51] Int. Cl.$^5$ ............................................... C02F 5/14
[52] U.S. Cl. ....................................... 210/699; 134/3; 134/22.14; 134/22.19; 134/41; 210/631; 210/700; 210/701; 252/82; 252/180; 252/181
[58] Field of Search ................................. 210/696–701, 210/631; 252/180, 181, 80, 82; 134/2, 3, 22.13, 22.14, 22.19, 41

[56] References Cited

U.S. PATENT DOCUMENTS

| | | | |
|---|---|---|---|
| 3,898,037 | 8/1975 | Lange et al. | 210/701 |
| 4,328,106 | 5/1982 | Harrar et al. | 210/700 |
| 4,640,793 | 2/1987 | Persinski et al. | 210/701 |
| 4,680,135 | 7/1987 | Cha et al. | 252/180 |
| 4,711,725 | 12/1987 | Amick et al. | 210/701 |
| 4,913,823 | 4/1990 | Lipinski et al. | 210/699 |
| 5,078,891 | 1/1992 | Sherwood et al. | 210/699 |

OTHER PUBLICATIONS

"Advances In Understanding Struvite Formation And Possible Methods Of Control"; by Robert McNabb; The Bulletin, Winter 1991; printed by The California Water Pollution Control Association.

"Characterizing The Dispersing Polymers For Water Treatment"; by William M. Hann, Judy H. Bardsley, and S. Tabb Robertson, published by Rohm and Haas, Mar. 1990.

"Acumer Water Treatment Polymers"; published by Rohm and Haas Company, Mar. 1991.

"Dequest 2010 Organophosphorus Product For Scale Prevention & Corrosion Inhibition In Water Treatment"; Technical Bulletin IC/SCS-313; published by Monsanto Dec. 1971.

"New Acrylate Polymers For Water Treatment Programs"; by Michael J. Ellis, William M. Hann, and Judy H. Bardsley; Resin Review 1987; vol. XXXVII No. 3, pp. 2–19.

*Primary Examiner*—Peter A. Hruskoch
*Attorney, Agent, or Firm*—Willie Krawitz

[57] ABSTRACT

Scale is removed, and its formation is reduced or prevented in the effluent section of a sewage treatment plant, by adding a solution containing a small amount of phosphonate and a terpolymer of acrylic acid. The treatment is especially effective in anaerobic areas of the plant, which includes transfer lines from sludge handling systems, pumps, piping, valves, overflow lines, and possibly centrifuges, etc., and particularly where the $Ca+2$ exceeds about 600 ppm, and the system alkalinity varies from about pH 6–9.

9 Claims, No Drawings

PROCESS FOR REMOVING SCALE, AND REDUCING SCALE FORMATION IN SEWAGE TREATMENT PLANTS

BACKGROUND OF THE INVENTION

This invention relates to a new and improved composition and process for removing scale or reducing scale formation in sewage plants. The composition and process are particularly suitable for use in anaerobic areas of a sewage plant such as in transfer lines from the system clarifier to areas such as sludge digestion and handling, including pumps, piping, valves, overflow lines, and possibly in centrifuges, etc.

These areas tend to be susceptible to precipitation of ions such as Ca, Fe, and Si, and the resulting formation of scale and struvite, especially under conditions of pH 5–9, and at temperatures from about ambient to exceeding 100 F.

In sewage treatment plants, struvite tends to occur in a bacteria laden and high solids environment, under conditions of agitation, and a pH of about 5–9. Scale, which occurs as a type of CaCO3, forms more frequently at a pH of about 7.2–8.4, especially where the Ca+2 content exceeds about 600 ppm. Given these unusual operating conditions and wide pH ranges, it is difficult to devise a suitable treatment for removing both scale and struvite.

Scale formation in sewage treatment plants has also been associated, in part, with vivianite and/or struvite, the latter being a magnesium ammonium phosphate hexahydrate, but this knowledge has not resulted in formulating a real solution to the deposition of CaCO3, vivianite or struvite, or for reducing scale generally in sewage treatment plants. Struvite deposition is discussed in THE BULLETIN, Winter 1991, printed by the California Water Pollution Control Association, and entitled: "Advances in Understanding Struvite Formation and Possible Methods of Control", by Robert McNabb.

Scale formation in boilers, and corrosion in water treatment plants such as cooling towers, boilers, heat exchangers, etc., has been prevented by using di-phosphonic acids; also, di-phosphonic acids are well known as cleaning and bleaching agents, corrosion inhibitors, etc. Moreover, acrylic acid terpolymers both alone, and in conjunction with di-phosphonates, have been used to prevent scale formation and to stabilize aqueous systems in these same areas. U.S. Pat. No. 4,711,725 discloses the use of acrylic acid terpolymers and interpolymers for this purpose. However, neither phosphonic acids either alone or together with terpolymers, have been known to remove scale generally, or struvite in particular, in sewage treatment plants.

U.S. Pat. No. 5,078,891 discloses the use of phosphonates with acrylic acid ether copolymers, and U.S. Pat. No. 4,640,793 discloses the use of a mixture or copolymer of a carboxylic acid with a sulphonic acid and a polycarboxylate phosphonate. But neither patent teaches the use of anionic groups in the polymers which are considered necessary to produce the desired descaling effects in sewage treatment plants.

The combination of phosphonohydroxyacetic acid and an acrylate copolymer functions to merely disperse (rather than actually dissolve CaCO3) in cooling tower descaling experiments. These latter tests were described in, "NEW ACRYLATE POLYMER FOR WATER TREATMENT PROGRAM", by Michael J. Ellis, William M. Mann, and, Judy M. Bardsley, published in RESIN, 1987, Volume XXXVII, No. 3, pages, 3–19, on page 9, Table V. Also as further shown in Table V, phosphonic acids such as phosphonohydroxyacetic acid alone will merely suspend, rather than dissolve CaCO3.

In addition, acrylic acid terpolymers do not appear capable of dissolving iron oxides and calcium phosphates and silicates in the form of hydroxyapatites and serpentines, but merely function to suspend these materials, as shown in Table VIII, page 16, of the RESIN publication, supra.

THE INVENTION

According to the invention, there is provided a composition and process for reducing and removing scale in sewage treatment plants, comprising adding to the sewage water in an area containing scale including calcium carbonate, vivianite and struvite an effective amount of a solution of a phosphonate, and a water soluble acrylic acid terpolymer or interpolymer.

Although phosphonates, phosphonic acids and acrylic acid terpolymers are known to only inhibit scale and corrosion, it has been found, unexpectedly, that if phosphonic acids or phosphonates are combined with the acrylic acid terpolymers or interpolymers, scale is actually removed in the sewage plant, rather than being merely inhibited in its formation.

DESCRIPTION OF THE PREFERRED EMBODIMENTS

Effective treatment concentrations in the sewage system of the water soluble components of phosphonates, phosphonic acids and acrylic acid terpolymers, and described, infra are at least about 30 ppm and, generally about 30–60 ppm. Ratios of the terpolymer (which includes the term interpolymer) to the phosphonates or phosphonic acid vary from about 1:1 to 3:1, and higher; preferred ratios are about 2:1. A preferred solution contains: terpolymer: 9%; phosphonic acid: 4.5%; and, balance: water all parts by weight.

Suitable phosphonic acids (which also includes phosphonates, and mixtures thereof) are 1-hydroxyethylidene-1,1-diphosphonic acid (HEDP), and this compound is sold by Monsanto under the trademark of DEQUEST 2010. The diphosphonic acid form is preferred since it resists chlorine degradation, and also is effective in removing Fe+3. Amino phosphonic acid (AMP) is more effective in removing Ca+2, and also where chlorine degradation does not pose significant problems. Other phosphonic acids and phosphonates include amino tris(methylene phosphonic acid)—DEQUEST 2000; pentasodium amino tris (methylene phosphonate)—DEQUEST 2006; diethylene triamine penta(methylene phosphonic acid)—DEQUEST 2060; hexamethylene diamine tetra(methylene phosphonate)—DEQUEST 2051; octasodium diethylene triamine penta(methylene phosphonate)—DEQUEST 2066; hexapotassium hexamethylene diamine tetra(methylene phosphonate)—DEQUEST 2054; 2-phosphonobutane-1,2,4-tricarboxylic acid; and, phosphonohydroxy acetic acid.

Suitable acrylic acid terpolymers are disclosed in U.S. Pat. No. 4,711,725 and incorporated herein by reference. These terpolymers are sold by Rohm and Haas Company under the trademark of ACUMER 3000 and 3100; similar terpolymers are sold by B.F. Goodrich under the trademark of 798 K-700. The terpolymers contain a strong acid (sulfonate), a weak acid (carboxylate) and, a nonionic group to provide dispersancy.

The acrylic acid terpolymer comprises about 11–40 weight percent of a 2-acrylamido-2-methylpropane sulfonic acid, about 10–84 weight percent of an acrylic acid and about 5 to 50 percent of a nonionic group to impart dispersancy.

The most effective terpolymers, and mixtures thereof, include acrylic acid and 2-acrylamido-2-methylpropane sulfonic acid with one or two functional groups of: hydroxyethyl methacrylate, vinyl acetate, acrylamide, ethylacrylate, t-butyl acrylate, hydroxypropyl acrylate, cellosolve acrylate, t-octyl acrylamide, dimethyl acrylamide, propyl acrylamide, t-butyl acrylamide, cyclohexyl acrylamide, t-butyl methacrylamide, benzyl methacrylamide, etc. Acrylic acid inter-polymers include acrylic acid and 2-acrylamido-2methylpropane sulfonic acid, with two of hydroxyethyl acrylate, ethyl acrylate, t-butyl acrylamide, etc.

Useful weight average molecular weights of the terpolymer or interpolymer vary from about 2,500 to about 8,000 and in any event, without the formation of flocculent; preferred weight average molecular weights vary from about 4,000 to about 5,500. The ACUMER 3100 terpolymer has a weight average molecular weight of about 4,500.

The solution of phosphonic acid and terpolymer may contain 5% of HCl, which will significantly improve descaling times. However, HCl is a dangerous ingredient to handle, and consequently this represents a drawback to its use, and hence the capability for treatment at lower pH ranges. If desired, NaOH may be used to adjust the solution pH to about 2–9.

The composition and process of this invention has been employed effectively in preventing scale formation by adding the composition to the sewage water in the area containing the aforementioned scale, and/or removing scale in sewage treatment plants such as the San Luis Rey Oceanside Water Treatment Plant, Eastern Municipal Water District San Jacinto and Marino Valley Plants, City of San Bernadino Waste Water Treatment Plant, etc., all in Calif. These treatment plants are processed at water concentrations having a high solids and/or alkalinity content. Typically, the solids content will vary from about up to 15%, and the alkalinity will vary from about pH 6–9.

When the solution of this invention is applied to machinery parts of a sewage plant at 30–60 ppm, usually there is virtually an instantaneous removal of scale, accompanied by effervescence.

Applying the same concentration of the solution to piping, transfer lines, overflow lines, etc., requires about 6–8 weeks for removal of the scale.

I claim:

1. A process for removing scale and reducing scale formation including $CaCO_3$, vivianite and struvite, on components of a sewage treatment plant processing sewage water, comprising: adding to the sewage water an effective amount of an aqueous solution of acrylic acid terpolymer containing about 11–40 weight percent of a 2-acrylamido-2-methylpropane sulfonic acid, about 10–84 weight percent of an acrylic acid and about 5 to about 50 weight percent of a nonionic group selected from the class consisting of hydroxyethyl methacrylate, vinyl acetate, acrylamide, ethyl acrylate, t-butyl acrylate, hydroxypropyl acrylate, cellosolve acrylate, t-octyl acrylamide, dimethyl acrylamide, propyl acrylamide, t-butyl acrylamide, cyclohexyl acrylamide, t-butyl methacrylamide, benzyl methacrylamide, hydroxyethyl acrylate, and mixtures thereof, to remove said scale and reduce said scale formation, together with a phosphonic acid, or a phosphonate, the solution having a pH range of about 2–9, the weight average molecular weight of the terpolymer being from about 2,500–8,000 without flocculent formation, the ratio of perpolymer to phosphonic acid or phosphonate being from about 1:1 to 3:1, and the effective amount of acrylic acid terpolymer and phosphonic acid or phosphonate being at least about 30 ppm in the sewage solution.

2. The process of claim 1, in which the aqueous solution includes HCl to augment removal of the scale.

3. The process of claim 1, in which the weight average molecular weight of the said terpolymer varies from about 4,000 to about 5,500.

4. The process of claim 1, in which the phosphonic acid is a di-phosphonic acid.

5. The process of claim 1, in which the phosphonic acid is selected from the class consisting of: aminophosphonic acid, 1-hydroxyethylidene-1,1-diphosphonic acid, hexapotassium hexamethylene diamine tetra(methylene phosphonate), diethylene triamine penta(methylene phosphonic acid), pentasodium amino tris(methylene phosphonate), amino tris(methylene phosphonic acid), hexamethylene diamine tetra(methylene phosphonate), octasodium diethylene triamine penta(methylene phosphonate), and mixtures thereof.

6. The process of claim 1, in which the components are the machinery components of the sewage plant, the scale being removed therefrom while accompanied by an effervescent reaction.

7. The process of claim 1, in which the components of the sewage treatment plant, include piping, transfer lines, and overflow lines, and the said scale is removed in about 6–8 weeks.

8. The process of claim 1 wherein the sewage water has a temperature from about ambient to exceeding 100 F, is a pH 5–9, a $Ca+2$ concentration exceeding about 600 ppm, is under anaerobic conditions or is agitated.

9. The process of claim 8, in which the amount of the aqueous solution is from about 30 ppm–60 ppm.

* * * * *